United States Patent
Wille

(10) Patent No.: US 6,430,283 B1
(45) Date of Patent: *Aug. 6, 2002

(54) COMMUNICATION SYSTEM CONSISTING OF AT LEAST TWO PRIVATE BRANCH EXCHANGES WITH PBX TEAM FUNCTION

(75) Inventor: Klaus Wille, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,622

(22) PCT Filed: Sep. 18, 1997

(86) PCT No.: PCT/DE97/02114

§ 371 (c)(1),
(2), (4) Date: Mar. 30, 1999

(87) PCT Pub. No.: WO98/15135

PCT Pub. Date: Apr. 9, 1998

(30) Foreign Application Priority Data

Sep. 30, 1996 (DE) .......................................... 196 40 221

(51) Int. Cl.[7] .................................................. H04M 7/00
(52) U.S. Cl. .................. 379/225; 379/216.01; 379/219; 379/220.01; 379/229
(58) Field of Search ................................ 379/196, 197, 379/198, 207, 216, 219, 220, 221, 225, 229, 230, 231, 232

(56) References Cited

U.S. PATENT DOCUMENTS 6,047,058 A * 4/2000 Wille .......................... 379/216

OTHER PUBLICATIONS

688 NTZ Nachrichten Technische Zeitschrift, 47 (1994) Nov., No. 11, Berlin No Translation.
688 NTZ Nachrichten Technische Zeitschrift 45 (1992) Sep., No. 9, Berlin No Translation.
2323 Telcom Report (Siemens) 18 (1995) Maerz/Apr., No. 2, Munchen No Translation.
2323 Telcom Report (Siemens) 18 (1995) Sep./Oct. No. 5, Munehcn No Translation.
Integrated ISDN D–Server for Intelligent Networking, Eberl et al, pp. 0539–0542.
2323 Telcom Report, (Siemens) 16 (1993) Sep./Oct., No. 5, Munchen No Translation.
8057 L'Onde Electrique, 72 (1992) Sep./Oct., No. 5, Paris No Translation.

* cited by examiner

Primary Examiner—Creighton Smith
(74) Attorney, Agent, or Firm—Bell, Boyd & Lloyd LLC

(57) ABSTRACT

A communication system with a plurality of private branch exchanges and [sic] team function overlapping private branch exchanges wherein, a team function controller is provided in a private branch exchange and the team terminal equipment of another private branch exchange are connected via an extension connection in the form of a hot line. A team function sub-controller in the private branch exchange of the detached subscribers switches the calls of these subscribers via the hot-line and the private branch exchange with the team function controller. Given malfunction of this private branch exchange or of the hot-line, the team function sub-controller routes calls outgoing from the detached team terminal equipment via a network termination device of the communication network to which they are directly connected.

4 Claims, 1 Drawing Sheet

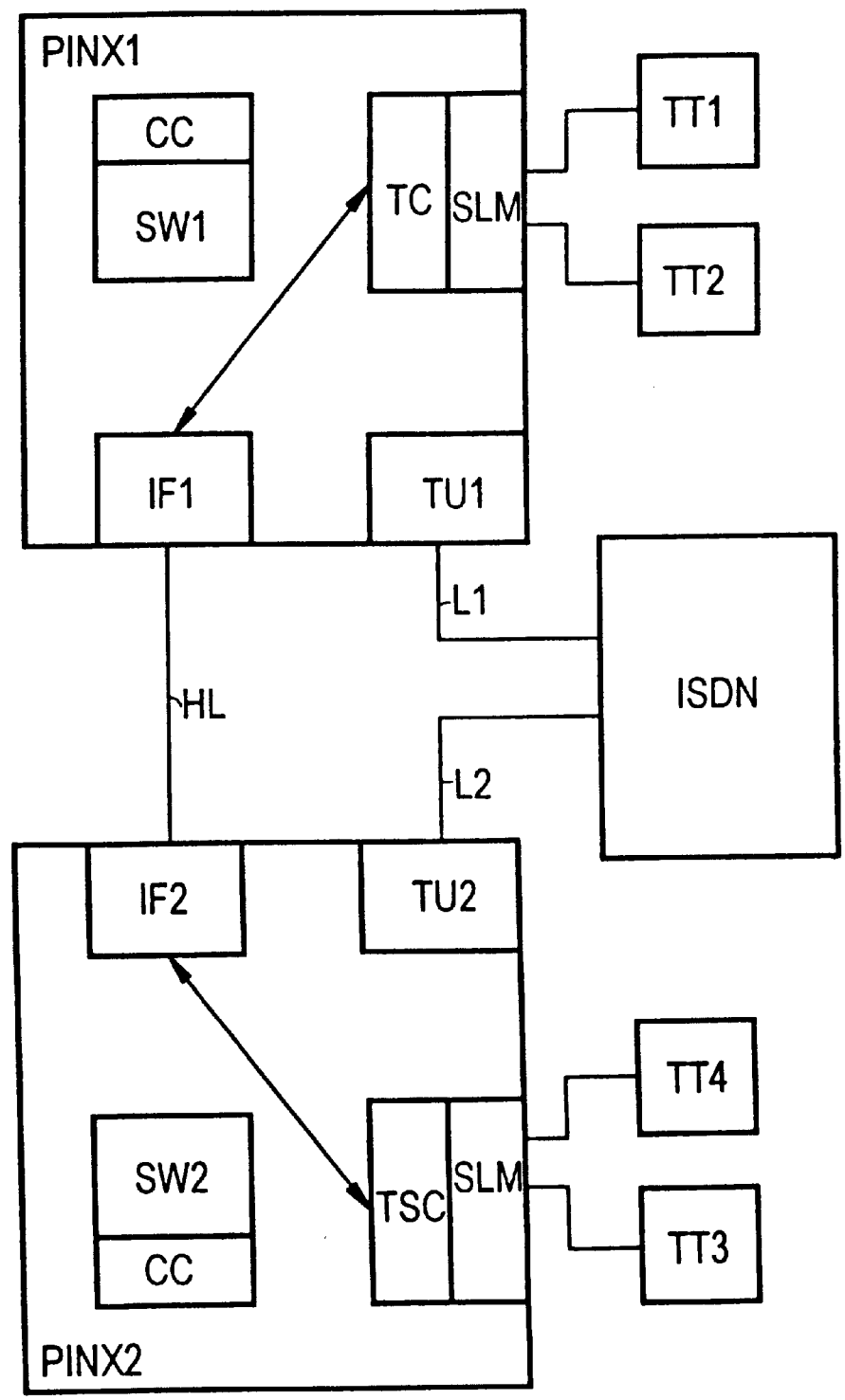

COMMUNICATION SYSTEM CONSISTING OF AT LEAST TWO PRIVATE BRANCH EXCHANGES WITH PBX TEAM FUNCTION

BACKGROUND OF THE INVENTION

1. Field of the Invention

The present invention is directed to a communication system that includes at least two private branch exchanges respectively having an exchange controller and at least one switching node that is connected via a network termination device [sic] to at least one higher-ranking communication network and that is connected via at least one subscriber line to terminal equipment. As such a team function controller is provided in one of the private branch exchanges, for controlling specific terminal equipment according to a team function as team terminal equipment of a team. Such can be called via the switching node of this private branch exchange wherein the controller can initiate a signalling to other team terminal equipment dependent on the switching-oriented condition of individual team terminal equipment as well as influence their switching-oriented condition.

2. Description of the Prior Art

Such interconnected private branch exchanges, a team function being realized in at least one thereof, are known, for example, in the form of the private branch exchange HICOM 300 commercially distributed by Siemens AG. For example, one known team function is the "call pickup" function, wherein incoming calls are displayed within a call pickup group composed of a plurality of exchange equipment and can be accepted at any terminal equipment that belongs to the call pickup group. Another known team function is the "collective line" function that can be reached under a specific collective number. Each party of a collective line thereby also can be directly called via an individual telephone number. However, all parties are reached via the specific collective number. For example, the collective number is allocated to a master terminal equipment. Another known team function is the integrated reception system that is also referred to as a boss-secretary system.

In known communication systems, all members of a team are connected to a single private branch exchange and are switched to a higher-ranking communication network via the same network termination device.

An object of the present invention therefor is to offer a communication system wherein a team function also can be realized with detached team members.

SUMMARY OF THE INVENTION

According, the present invention. That at least one first team terminal equipment of the team is directly connected to a switching node of the first private branch exchange via a subscriber line and at least one second team terminal equipment, as detached member of the team, is connected to a switching node of the second private branch exchange as terminal equipment via a subscriber line unit. As such, this detached member can be reached via the switching node of the via first private branch exchange, a hot-line connection between the first and the second private branch exchange and via a switching node of the second private branch exchange.

A team function sub-controller is provided in the second private branch exchange in order to switch an outgoing call from the team terminal equipment into the higher-ranking communication network via the hot-line connection and the switching node of the first private branch exchange and, given a malfunction of the hot-line connection or of the switching node of the first private branch exchange, in order to switch an outgoing call from the second team terminal equipment via the network termination device of the second private branch exchange.

The connection of team terminal equipment as detached members via a hot-line connection makes it possible to arrange members of a team within a company network at an arbitrary spatial distance from one another. The inventive team function sub-controller in the private branch exchange to which the team terminal equipment of the detached member is directly connected assures that calls outgoing from team terminal equipment of detached members can be switched into the higher-ranking communication network even given outage of the hot-line connection to the home switching node of the team or given outage of this home switching node.

A beneficial embodiment of the inventive communication system provides that the team function sub-controller acquires the availability of the switching node of the first private branch exchange and the availability of the hot-line connection between the two private branch exchanges by checking the signalling connection required for the transmission of the subscriber-to-subscriber messages for the remote members. In this case, the availability check does not require any B-channel resources. Further, no additional signalling is required.

Additional features and advantages of the present invention are described in, and will be apparent from, the Detailed Description of the Preferred Embodiments and the Drawings.

DESCRIPTION OF THE DRAWINGS

FIG. 1 shows the communication system of the present invention in a schematic block diagram form.

DETAILED DESCRIPTION OF THE PREFERRED EMBODIMENTS

The schematic block diagram of FIG. 1 shows a communication system composed of a first private branch exchange PINX1 with an exchange controller CC, a first switching node SW1, a team function controller TC and a first network termination means TU1 that is connected to a higher-ranking communication network ISDN via a connection L1. Two team terminal equipment TT1 and TT2 are respectively connected to the first switching node SW1 via a subscriber line means SLM and are controlled by the team function controller TC. The team function controller TC also controls a connection to a first hot-line interface IF1.

The second private branch exchange PINX2 contains an exchange controller CC and a second switching node SW2 to which, among other things, two team terminal equipment TT3 and TT4 are connected via a subscriber line means SLM. The second private branch exchange PINX2 is connected to the higher-ranking communication network ISDN via a second network termination means TU2 and a connection L2.

A team function sub-controller TSC controls the team terminal equipment TT3 and TT4 and also controls a connection to a second hot-line interface IF1. The first hot-line interface IF1 of the first private branch exchange PINX1 is connected via a hot-line connection HL to the second hot-line interface IF2 of the second private branch exchange PINX2.

The team function sub-controller initiates the switching of a call outgoing from the team terminal equipment into the higher-ranking communication network via the hot-line connection and the switching node of the first private branch exchange. Given a malfunction of the hot-line connection or of the switching node of the first private branch exchange, the team function sub-controller initiates the switching of a call outgoing from the second team terminal equipment via the network termination device of the second private branch exchange.

Although the present invention has been described with reference to specific embodiments, those of skill in the art will recognize that changes may be made thereto without departing from the spirit and scope of the invention as set forth in the hereafter appended claims.

What is claimed is:

1. Communication system composed of at least one first private branch exchange (PINX1) with an exchange controller (CC) and at least one first switching node (SW1) that is connected via a first network termination means (TU1) to at least one higher-ranking communication network (ISDN) and via at least one subscriber line means (SLM) to terminal equipment (TT1, TT2), and composed of at least one second private branch exchange with an exchange controller (CC) and at least one second switching node (SW2) that is connected via a second network termination means (TU2) to the higher-ranking communication network (ISDN) and via at least one subscriber line means (SLM) to terminal equipment (TT3, TT4), whereby a team function controller (TC) is provided in the first private branch exchange (PINX1), said team function controller controlling specific terminal equipment according to a team function as team terminal equipment of a team that can be called via the first switching node (SW1) and thereby initiating a signalling to other team terminal equipment dependent on the switching-oriented condition of individual team terminal equipment as well as influencing their switching-oriented condition, characterized in that at least one team terminal equipment (TT1, TT2) of the team is directly connected to the first switching node (SW1) as terminal equipment via a subscriber line means (SLM) and at least one second team terminal equipment (TT3, TT4), as detached member of the team, is connected to the second switching node (SW2) via a subscriber line means (SLM) and can be reached via the first switching node (SW1), a hot-line connection (HL) between the first and the second switching node (SW1, SW2) and the second switching node (SW2); and in that a team function sub-controller (TSC) is provided in the second private branch exchange (PINX2) in order to switch a call outgoing from the second team terminal equipment (TT3, TT4) into the higher-ranking communication network (ISDN) via the hot-line connection (HL) and the first switching node (SW1) and, given a malfunction of the first switching node (SW1) or of the hot-line connection (HL), in order to switch a call outgoing from the second team terminal equipment (TT3, TT4) via the network termination means (TU2) of the second private branch exchange.

2. Communication system according to claim 1, characterized in that the team function sub-controller (TSC) checks an availability of the first switching node (SW1) and of the hot-line connection (HL) between the first and the second switching node (SW1, SW2) by checking the signalling connection required for the transmission of the subscriber-to-subscriber messages for the detached subscribers.

3. A communication system, comprising:

at least one first private branch exchange, the first private branch exchange including an exchange controller and at least one first switching node that is connected first via a first network termination device to at least one higher-ranking communication network and second via at least one subscriber line to terminal equipment, the first private branch exchange further including a team function controller for controlling specific terminal equipment according to a team function as team terminal equipment of a team that can be called via the first switching node to initiate a signaling to other team terminal equipment dependent on a switching-oriented condition of individual team terminal equipment as well as to influence their switching-oriented condition;

at least one second private branch exchange, the second private branch exchange including an exchange controller and at least one second switching node that is connected first via a second network termination device to the higher-ranking communication network and second via at least one subscriber line to second terminal equipment;

wherein at least one team terminal equipment of the team is directly connected to the first switching node as terminal equipment via a subscriber line and at least one second team terminal equipment, as detached member of the team, is connected to the second switching node via a subscriber line and can be reached via the first switching node, via a hot-line connection between the first and the second switching node, and via the second switching node; and wherein a team function sub-controller is provided in the second private branch exchange to switch a call outgoing from the second team terminal equipment into the higher-ranking communication network via the hot-line connection and the first switching node and, given a malfunction of one of the first switching node and the hot-line connection, in order to switch a call outgoing from the second terminal equipment via the network termination means of the second private branch exchange.

4. A communication system as claimed in claim 3, wherein the team function sub-controller checks an availability of the first switching node and of the hot-line connection between the first and the second switching node by checking the signaling connection required for transmission of the subscriber-to-subscriber messages for the detached subscribers.

* * * * *